United States Patent [19]

Stoll

[11] 4,351,229

[45] Sep. 28, 1982

[54] FLUID POWER DRIVING UNIT

[76] Inventor: Kurt Stoll, Lenzhalde 72, 7300 Esslingen/N, Fed. Rep. of Germany

[21] Appl. No.: 208,455

[22] Filed: Nov. 19, 1980

[30] Foreign Application Priority Data

Nov. 30, 1979 [DE] Fed. Rep. of Germany ....... 2948204

[51] Int. Cl.[3] ........................... F16J 11/02; F16J 1/00

[52] U.S. Cl. .................................. 92/128; 92/165 R; 92/169; 92/172; 91/DIG. 4; 403/341

[58] Field of Search ................. 92/169, 170, 171, 5 R, 92/128, 172, 165 R; 403/341, 286; 91/DIG. 4

[56] References Cited

U.S. PATENT DOCUMENTS

| | | | |
|---|---|---|---|
| 152,540 | 6/1874 | Winchester | 92/169 |
| 300,957 | 6/1884 | Courtnay | 92/169 |
| 579,186 | 3/1897 | Sickahouse et al. | 92/169 |
| 881,709 | 3/1908 | O'Leary | 403/286 |
| 1,456,166 | 5/1923 | Wilcox | 92/169 |
| 1,919,780 | 7/1933 | Fairbank | 403/341 |
| 3,390,580 | 7/1968 | Taylor | 92/5 R |

FOREIGN PATENT DOCUMENTS

| | | |
|---|---|---|
| 1982379 | 3/1968 | Fed. Rep. of Germany . |
| 1317105 | 5/1973 | United Kingdom . |

*Primary Examiner*—Paul E. Maslousky
*Attorney, Agent, or Firm*—Blanchard, Flynn, Thiel, Boutell & Tanis

[57] ABSTRACT

A fluid power driving unit for transport and other purposes is made up of an non-magnetic cylinder which may be joined up with a fluid power supply. Within the cylinder there is a glanded free piston having an inner magnetic system for moving an outer runner supported on the outside face of the cylinder, by way of a further magnetic system in the runner. The inner and outer magnetic systems are designed so as to be clear of the inner and outer faces of the cylinder. The cylinder is made up of a number of separate cylinder lengths whose ends are overlapping and furthermore each cylinder length has a stiffening and reinforcing rail, which rails are joined together at their ends and may be undone from each other if desired.

4 Claims, 3 Drawing Figures

FLUID POWER DRIVING UNIT

FIELD OF THE INVENTION

The present invention relates a fluid power driving unit, and more specially to such a unit made up of a cylinder of unmagnetic material joined up to a driving fluid supply, and a free pistion within the cylinder, the piston having an inner magnet system. Furthermore, on the cylinder is supported a power output runner having an outer magnet system. The two magnet systems are radially clear of the cylinder surfaces they are next to.

BACKGROUND OF THE INVENTION

Although fluid power driving units as designed on these lines have been put forward in the past, the length of the cylinder has been limited to normal sizes, as for example of 3–4 meters, because present-day production engineering does not make it possible for single-piece cylinders to be made any longer.

In this respect, one purpose of the present invention is that of so designing a fluid power driving unit of the sort named which is generally speaking of indefinite length, that is to say may be designed with any length to be in line with the purpose on hand, so that there is no limit to the amount of piston motion, this being possible without overstepping the present-day limit in production engineering with respect, for example, to the machining of very long cylinders. Furthermore, trouble-free operation of the piston along the full cylinder length is to be possible.

SUMMARY OF THE INVENTION

For effecting these and other purposes a fluid power driving unit based on the invention is made up of a power cylinder of nonmagnetic wall material having inner and outer faces, a free piston designed for motion along and within the cylinder on changing the amount of fluid in the cylinder on the two sides of the piston, a power output runner guidingly supported on the cylinder, a magnetic system supported on the piston so as to be radially clear of the inner face, a magnetic system supported on the runner so as to be radially clear of the outer face, the two magnetic systems being designed for producing a magnetic force connection through the wall material for power-moving the runner in step with the piston, in the case of which the unit furthermore has a stiffening rail running lengthways along the cylinder and fixed thereto and furthermore (a) the cylinder is made up of separate cylinder lengths which may be unjoined from each other for changing the length thereof, (b) each cylinder length is joined to the rail, and (c) the rail is made up in separate rail lengths whose ends may be unjoined from each other.

On using the teaching of the present invention it is now possible for cylinders of the sort coming into question to be unlimited in length. In the case of prior art systems with one piece driving cylinders there has been an upper limit, as noted earlier, of some meters in length for reasons of production engineering while on the other hand the joining up of single lengths of cylinder was not possible because of the piston rod. It is now possible, using the teaching of the present invention, for the cylinder length to be made two times, three times or four times or more longer than in the prior art. The system takes up relatively little space because there is no piston rod and furthermore the cylinder does not become bent because it is stiffened by the stiffening rail. Taking an all-round view, it may be said that the system of the invention may be readily put to any desired use on making the necessary changes in length.

As a further development of the invention the power output runner may be guided by the rail so that the rail effects more than just a stiffening function, while furthermore the rail may be in the form of a flat cross-section bar which is generally radial with respect to the cylinder so that its stiffening effect is stepped up and any small amount of bending of the cylinder will be such as to be unimportant.

The unit of the invention may be used with good effect for example for transport of goods within industrial facilities, for example a system on which the parts are hangingly supported. More specially, such a system may be used for the transport of bulky goods and parts which are not able to be transported inside pneumatic transport systems. The systems of the present invention may be used furthermore for other purposes in which a tool or the like has to be moved great distances, as for example for greasing the inner faces of long cylinders or gun barrels and furthermore for other purposes such as moving material to be processed into deep annealing furnaces or other processing furnaces.

BRIEF DESCRIPTION OF THE DRAWINGS

To give a full picture of the invention, a detailed account will now be given of one working example of it using the accompanying figures.

DETAILED DESCRIPTION

Figure 1:
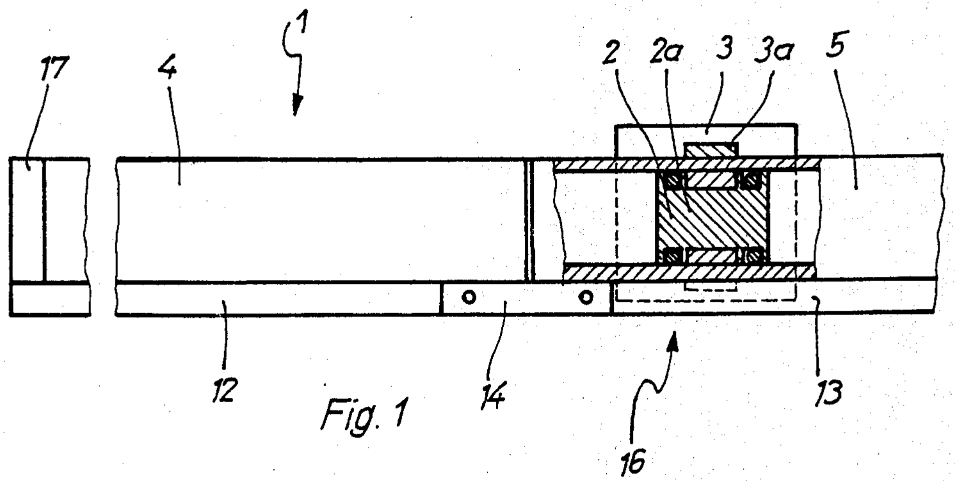
FIG. 1 is a diagrammatic side view, partly cut away, of a system of the present invention.

The fluid power driving unit of the invention for transport and other purposes is made up of a cylinder generally referenced 1 of non-magnetic material and which may be joined up with a driving fluid supply. Within the cylinder 1 there is a piston 2 which has an inner magnetic system 2*a* with permanent magnets. A power output runner 3 is placed round and guided on the cylinder and has the outer ring-like magnetic system 3*a*. The piston and the runner are not the main parts of the present invention and for this reason are not given a detailed account. The inner magnetic system and the outer magnetic system are placed so as to be radially clear of the cylinder faces they are next to. This design point is furthermore not a part of the present invention so that no special care has been taken in the drawings for making this radial play between the magnetic systems and the inner and outer faces of the cylinder clear.

Figure 2:
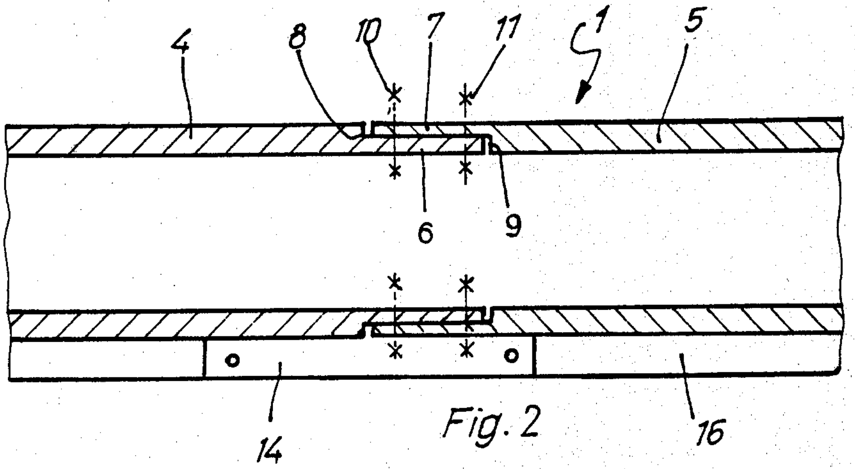
FIG. 2 is an axial section of the system of FIG. 1 on a greater scale.
Figure 3:
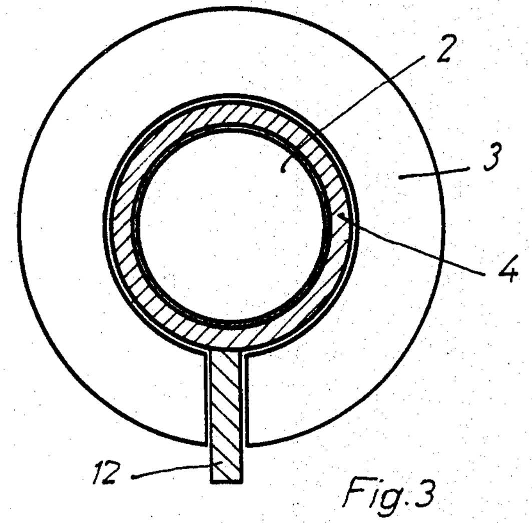
FIG. 3 is a front end view and a section on a greater scale of the system of FIG. 1.

Cylinder 1 is made up of a number of cylinder lengths 4, 5 which are joined up together end to end without any play between their ends and in such a way that they may be unjoined. The points of joining so formed are completely smooth so that they may be run over by piston 2 and output runner 3 without any jerks. For making such joints, two adjacent cylinder length ends such as 6 and 7 are stepped, this being marked by references 8 and 9, so that the two stepped ends are overlapping and take the form of a seamless, completely smooth change-over from one length to the next one as may be seen in FIG. 2. The overlapping ends are screwed together as marked by reference 10 and 11. Furthermore, the ends of any rail cylinder length and the next length may be joined together with the use of gaskets, for example ring-gaskets, which however are not given in the figures. The joining up of the cyliinder lengths may however take place in some other way, the only condition which has to be kept to being that the joints have to be fluid-tight and that there are no changes in the inner diameter of the cylinder. Furthermore the cylinder has to be smooth. This is to make certain that the pistons and the outer runner may be moved along the cylinder without any jerks and may be moved over the joints as freely as on (and in) other parts of the cylinder.

If the cylinder is made up of such separate lengths, the overall length may be as desired and it is possible for example for cylinder lengths of six to seven or even eight meters to be joined together with two or three such lengths in a way dependent on the desired purpose of use: for example for upright transporting systems, for flag poles, or, to take another example, for moving a watering head backwards and forwards over a seedbed. For stopping any bending or sagging of the cylinder when it is of great length, the cylinder lengths each have an outside stiffening or reinforcing rail length 12, 13 which is parallel to the cylinder's axis. One end of each rail length is joined up with the end of the next stiffening rail 12 or 13 on the cylinder length 4, 5 by way of fishplates 14 so that they may be undone if desired, and when joined up together take the form of a guide rail 16 for the output drive runner, the guide rail 16 being on the outside of cylinder 1 and parallel to its axis, as will be seen more specially from FIG. 1. It is best for such stiffening rail lengths to have a cross-section with two long sides parallel to each other and generally radial with respect to the cylinder, and with two shorter sides at right angles to the two longer sides.

As part of a further development of the invention the cylinder length at the ends of the cylinder have at their axially outer ends end plates 17, which are fixed in position so as to be fluid-tight and so as to be able to be taken off if desired. Such end plates will furthermore best be designed with openings and unions for the inlet and outlet of the driving fluid for moving the free piston (that is to say one without a piston rod) along the cylinder. In the case of the working example to be seen in FIG. 1, the cylinder length 4 on the left has the end plate 17 while the cylinder length on the right hand side has at its right hand end a further end plate, both and plates being able to be taken off when desired.

The unit of the present invention makes for the further useful effect, as will be seen from the account given, that warehousing the parts thereof is generally simple because even with a small selection of parts a great number of different systems may be made up.

I claim:

1. In a fluid power driving unit which includes an elongate, hollow cylinder made of a non-magnetic material, a piston supported within said cylinder for movement lengthwise thereof, first means for introducing to and removing from said cylinder a fluid in a manner effecting movement of said piston therein, a runner supported on said outer surface of said cylinder for movement lengthwise thereof, and magnetic means provided on and magnetically coupling said piston and said runner for effecting movement of said runner along said cylinder synchronously with and in response to movement of said piston along said cylinder, the improvement comprising wherein said cylinder includes a plurality of cylinder sections and second means for releasably interconnecting said cylinder sections in an end to end manner, the adjacent ends of respective said cylinder sections overlapping each other and said inner and said outer surfaces of said cylinder being substantially smooth and continuous in the regions of said overlapping ends of said cylinder sections, and including a reinforcing rail section supported on said outer surface of and extending axially along each said cylinder section and guiding said runner and third means for releasably interconnecting the adjacent ends of respective said reinforcing rail sections on adjacent said cylinder sections.

2. The structure as claimed in claim 1, wherein the ends of said cylinder sections are stepped, a stepped part of each said cylinder section being received within a stepped part of greater diameter on a said cylinder section adjacent thereto.

3. The structure as claimed in claim 1 or claim 2, wherein said third means includes fishplates disposed against and releasably connected to the ends of adjacent said reinforcing rail sections.

4. The structure as claimed in claim 1, wherein said reinforcing rail sections each have a cross-section with two parallel sides which extend generally radially to said cylinder and two further parallel sides which extend at right angles to and are shorter than said first-mentioned sides.

* * * * *